United States Patent [19] | [11] Patent Number: 4,512,085
Liddell | [45] Date of Patent: Apr. 23, 1985

[54] METHOD OF AND APPARATUS FOR TELLING TIME AT NIGHT

[76] Inventor: Olin E. Liddell, 1166 Sunnyvale-Saratoga Rd., #36, Sunnyvale, Calif. 94087

[21] Appl. No.: 443,582

[22] Filed: Nov. 22, 1982

[51] Int. Cl.³ .............................................. G01C 17/34
[52] U.S. Cl. ....................................................... 33/269
[58] Field of Search ......................... 33/269, 270, 271; 434/142, 149, 111, 289

[56] References Cited

U.S. PATENT DOCUMENTS

| | | | |
|---|---|---|---|
| 340,452 | 4/1886 | Morse | 33/269 X |
| 1,044,238 | 11/1912 | Pilkington . | |
| 1,620,980 | 3/1927 | Meacham | 33/269 X |
| 1,875,756 | 9/1932 | O'Sullivan . | |
| 2,006,075 | 6/1935 | Lofgren | 434/289 |
| 2,532,324 | 12/1950 | Milligan | 33/269 |
| 2,582,179 | 1/1952 | Thomson | 33/269 |
| 2,657,525 | 11/1953 | Allen . | |
| 2,918,725 | 12/1959 | Ellsworth . | |
| 3,073,032 | 1/1963 | Fleming . | |
| 3,940,859 | 3/1976 | Troseth . | |
| 4,103,429 | 8/1978 | Wagoner . | |

FOREIGN PATENT DOCUMENTS

| | | |
|---|---|---|
| 145225 | 11/1954 | Sweden . |
| 112012 | 1/1919 | United Kingdom . |

OTHER PUBLICATIONS

J. Br. Astro. Assoc., 4/1977, "A Nocturnal", by D. Tattersfield

*Primary Examiner*—Harry N. Haroian
*Attorney, Agent, or Firm*—Jack M. Wiseman; Francis W. Anderson

[57] ABSTRACT

An instrument for telling time at night includes a base that has a central aperture for sighting on Polaris and an annular hour scale inscribed on the base with the axis of the aperture as the center of the annulus, a calendar scale rotatable on the base about said axis and having indicia adapted to be aligned with the indicia on the hour scale, and a pointer rotatable about said axis and arranged to be removably secured to the calendar scale with its indicating edge in alignment with a selected mark on the calendar scale.

24 Claims, 5 Drawing Figures

METHOD OF AND APPARATUS FOR TELLING TIME AT NIGHT

BACKGROUND OF THE INVENTION

Instruments for telling time at night by reference to stars have been used for at least two centuries. Instruments of this type are disclosed in the patents to Thompson, U.S. Pat. No. 2,582,179 and to Fleming, U.S. Pat. No. 3,073,032. In general these devices are relatively complicated, include accurately-made and precisely-adjusted parts, and require outside equipment such as a chronometer or a light source for proper setting or operation. Similarly, the instrument in the patent to Wagoner, U.S. Pat. No. 4,103,429, while simpler in design than the devices of the other two patents, still requires a stand or base to rest on, is cumbersome, and cannot be easily carried from place to place. Further, this device is limited to the observation of one star only, namely, Dubhe Ursa Major and this condition limits the amount of time that the instrument can be used for observation since, at many latitudes, Dubhe Ursa Major is observable in the month of July only from dusk to midnight, and in the month of October only from 2 a.m. to dawn. Also, none of the three above-mentioned instruments can be used to determine at night the longitude of an occupied position.

An object of the present invention is to provide a simple, very lightweight, completely portable nocturnal time piece that can be used as a hand-held device to accurately tell standard time on any clear night throughout the entire year with no outside equipment and with a limited amount of instructions.

SUMMARY OF THE INVENTION

An instrument for determining time includes a circular calendar disc with two fixed indicators representing the relative positions of two circumpolar stars in opposite quadrants rotatable relative to a circular time disc and a pointer adapted to be selectively attached to the calendar disc.

DESCRIPTION OF A PREFERRED INVENTION

The operation of the time indicator of the present invention is based on the fact that, to an observer, the night sky appears as a part of a sphere resting on the horizon. As the earth rotates from west to east about its polar axis, all objects in the fragmentary sphere appear to rotate from east to west. Since Polaris, the bright star which is close to the North Pole, moves in a very small circle around the pole, other stars appear to rotate around Polaris. Thus, by sighting on Polaris with the indicator of the present invention, the circular movement of certain stars can be checked at intervals.

Figure 4:
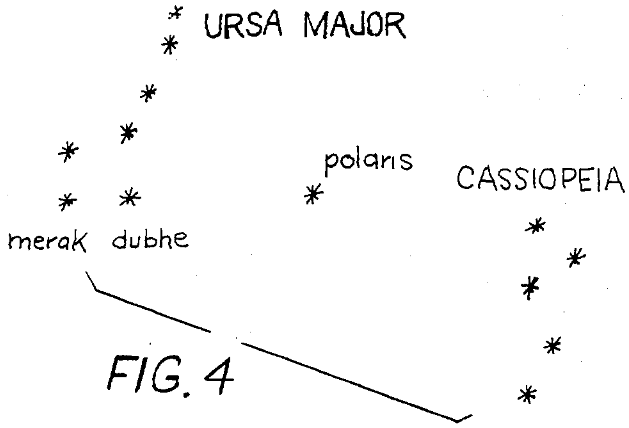
FIG. 4 is a diagrammatic showing of the counterclockwise rotation of two star clusters around the North Star.

In FIG. 4 the position of two major star constellations, Ursa Major and Cassiopeia, are diagrammatically shown rotating counterclockwise about Polaris. The instrument is usable with any circumpolar stars but Dubhe of Ursa Major and Calph of Cassiopeia were chosen for this instrument because they are very easy to identify, and because they are in opposite quadrants which means that one of the two is always visible on a clear night in the northern hemisphere. Also, even at more northern latitudes where both would be visible above the horizon at all times, one will usually be closer to an altitude of 90° above the horizon, minimizing refraction and therefore increasing accuracy.

Figure 1:
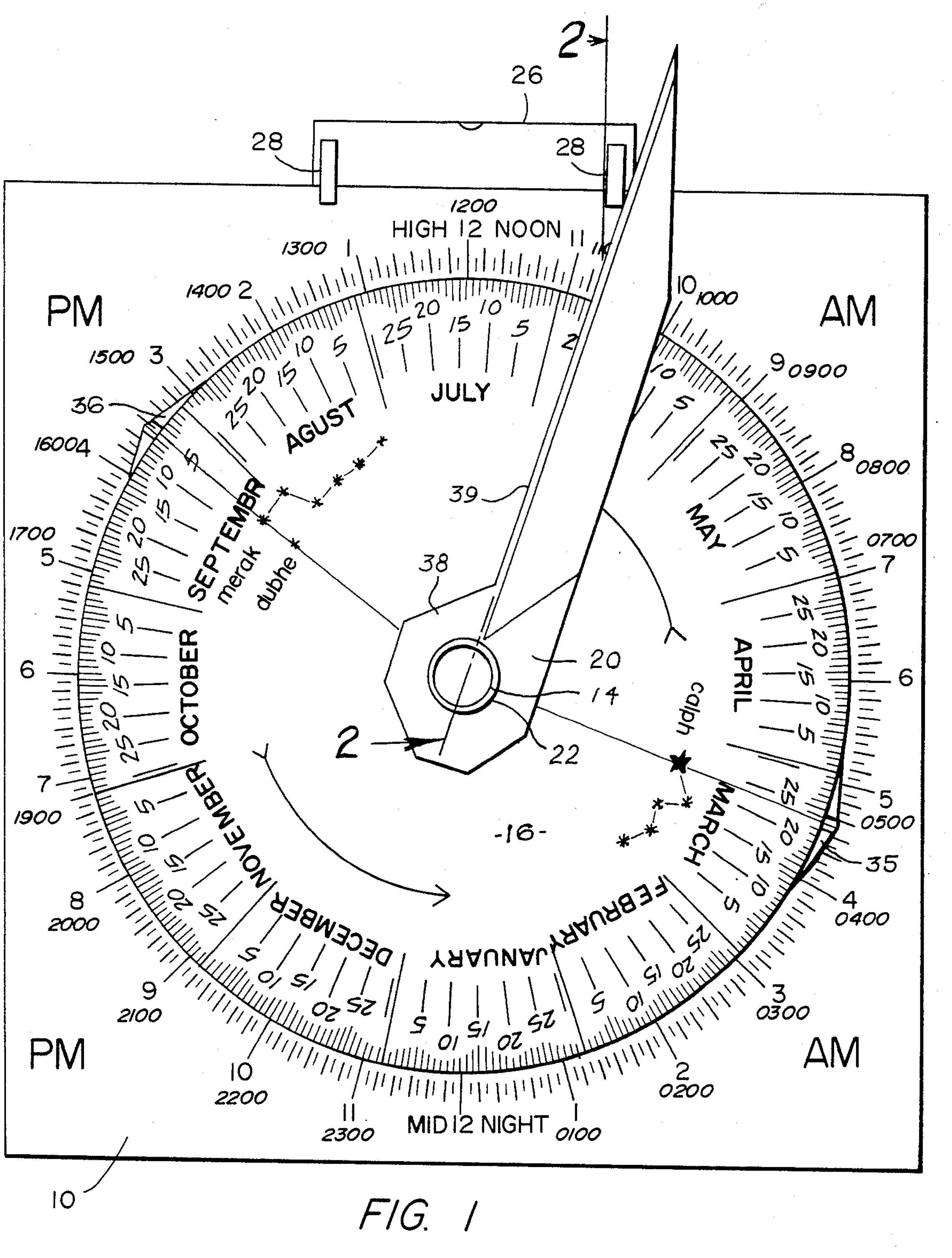
FIG. 1 is a diagrammatic elevation of one face of the time indicator of the present invention, showing the point of the dial in a position selected to show the structural relation of the members of the dial.
Figure 2:
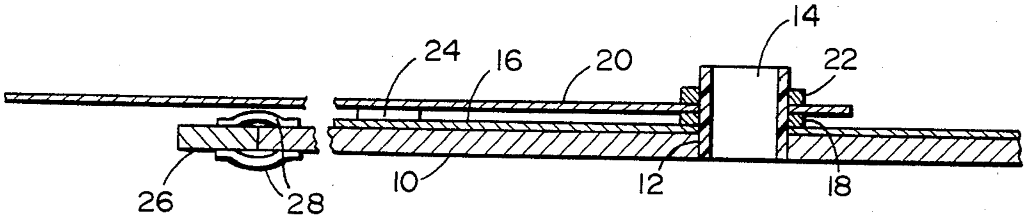
FIG. 2 is a fragmentary diagrammatic section taken generally along line 2—2 of FIG. 1.

The embodiment of the time indicator of the present invention shown in FIGS. 1 and 2 comprises a base plate 10 that is approximately seven and one-half inches square and about three-eighths of an inch in thickness. A hole 12, that is one inch in diameter, is formed in the base plate, and a short clear plastic tube 14 is secured, as by an adhesive, in the hole. The tube projects above the top surface of the base plate, and a relatively thin circular dial 16, which is about five and seven-eighths inches in diameter and is made of rigid material such as a heavy cardboard or plastic, is journalled on the tube for rotary movement relative to the base plate. A spacer sleeve 18 is disposed around the tube between the dial 16 and a pointer 20, which is also rotatably journalled on the tube, rests on the sleeve. An annular retainer 22, that is made of an elastic material such as rubber, is positioned on the tube above the pointer to resist movement of the dial and the pointer upwardly along the tube while permitting the free rotation of these members. A connector 24 (FIG. 2) for releasably attaching the pointer to a selected position on the dial is disposed between the pointer and the dial. In the embodiment of FIGS. 1 and 2, this connector is in the form of a short piece of double-faced tape which has one side adhesively secured to the undersurface of the pointer and its opposite face releasably adhering to the top surface of the dial so that the pointer will move in a rotary path with the dial when connected thereto, but can be separated from the dial when a force is applied to the pointer in a direction to move it away from the dial, thus breaking the connection between the connector 24 and the surface of the dial.

A spirit level 26 is held by pairs of spring clips 28 to the upper edge of the base plate 10. Since this upper edge of the base plate is a flat planar surface, and the lower surface of the level 26 is in flat abutting contact with the surface of the edge, the level will indicate the position of the surface relative to the horizontal.

Drawn on the face of the base plate 10 is an hour circle six inches in diameter. This circle is graduated every five minutes for twenty-four hours in a 360° circle counterclockwise, with 12:00 midnight at the bottom and 12:00 noon at the top. Each of the 288 graduations represents 1.25 degrees.

A calendar circle, which is printed around the periphery of the dial 16, is graduated into 365 divisions, one for each day of the year, and these divisions are grouped to indicate the twelve months of the year, with each month having its proper number of days. Each division represents 0.9863 of a degree of angular measurement. Two indicators 35 and 36 are integrally formed on and project radially outwardly from the periphery of the dial at spaced points around the periphery. These indicators are in the form of stylized arrow heads, the apex of indicator 35 being in radial alignment with a position at March 23 0.566 on the calendar circle between March 23 and March 24, i.e. a position 0.566 of the distance when moving away from the March 23rd graduation, to account for the Greenwich hour angle (G.H.A.) of the vernal equinox and the Sideral hour angle (S.H.A.) of Calph in B Cassiapeia. The indicator 36 is set at September 5.458 to account for the angular difference between the S.H.A. of Calph and the S.H.A. of Dubhe, Ursa Major, the lead star in the big dipper. The vernal equinox was determined by plotting the G.H.A. of the equinox counterclockwise from zero hours March 21 on the calendar circle. The G.H.A. of the equinox being 12 hours, 12 minutes, 57.586 seconds, this converts to 0.509 days; hence, the vernal equinox is placed at March 21.509 on the calendar circle unmarked. The equinox is also an imaginary point in the sky when the apparent sun crosses the plane of the equator from the southern hemisphere to the northern hemisphere once a year, presently approximately noon on March 21st.

At this point of development, the logical scheme of things is reversed. The S.H.A. of the stars and planets is measured counterclockwise (from east to west) from the imaginary point of the vernal equinox 0° to 360°. However, since the dial of the instrument is read face down when facing Polaris in order to get the correct time reading, it is necessary to plot the position of the indicators for Dubhe and Calph on the dial in a clockwise direction by the S.H.A. of the stars. Hence, S.H.A. of Calph is 357° 58.2′. This equals 357.97° divided by 0.9863° per day or 362.9433 days clockwise from March 21.509. This places the indicator for reading the time from Calph at March 23.566. Likewise, the S.H.A. of Dubhe being 194° 21.1′, this equals 194.3517° divided by 0.9863 or 197.0513 days clockwise from March 21.509. This places the indicator for reading the time by Dubhe at September 5.458.

The pointer 20 is an eight and three-quarter inch long thin strip of rigid white plastic that has an enlarged hub section 38. The hub is generally octagonal in configuration and has a circular hole at its central area that is adapted to receive the pivot tube 14 in rotatable engagement. The pointer is tapered inwardly toward its outer end and a straight edge 39 is formed along one side. The hole in the hub is concentric with the tube 14, and the edge 39 is disposed in a radial plane extending outwardly from the common axis of the hub and the tube. As will be explained presently, the edge 39 is used for setting a current date on the calendar circle of the dial and for sighting on the stars. To facilitate the sighting operation, the major part of the upper surface of the pointer can be covered with a black tape leaving exposed only a thin white line adjacent the edge 39.

To determine the time on a particular day, the pointer 20 is temporarily disconnected from the dial and rotated relative to the calendar circle to a position at which the sighting edge 39 of the pointer is in alignment with a date that is plus or minus one day from the current date for each degree of longitude away from the standard time meridian. Thus, one day is added to the current date for each degree of longitude that your position is east of the standard time meridian, or one day is subtracted from the current date for each degree of longitude that your position is west of the standard time meridian. In positioning the pointer on the dial, the position should be chosen to represent, as closely as possible, the part of the day at which the reading is taken.

As an example, if you are making a reading on October 31st in Los Gatos, Calif.; reference to a suitable map, atlas, or almanac will show that your position is approximately 122° west longitude or 2° west of the Pacific Standard time meridian of 120° west latitude. Accordingly, two days are subtracted from the current date, and the pointer is moved to the October 29th graduation. However, since this graduation represents zero hours on October 29th or midnight of October 28th, the pointer should be adjusted toward the October 30th graduation to compensate for the time of day at which the reading is made. Thus, if the reading is being made at 9:00 p.m., the pointer should be moved seven-eighths of the way to the October 30th graduation. When the desired position of the pointer is reached, the pointer is pressed toward the dial to cause the connector 24 on the underside of the pointer to grip the dial and lock the pointer relative to the dial.

Figure 3:
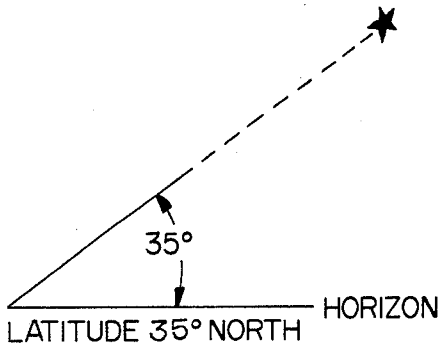
FIG. 3 is a schematic diagram indicating a method of locating a particular star.

The next step involves locating the North Star (Polaris). This can be accomplished by checking in an atlas for the approximate latitude of your location. Then, facing toward the north, Polaris will be the same degree above the horizon as your degree of latitude. This procedure is indicated in FIG. 3 for a location having a latitude of 35°. Another method of locating Polaris is based on the fact that the big dipper and the big W constellations are visible on any clear night. Polaris is located approximately half way between the big dipper and the big W, as seen in FIG. 4, and is generally on a line drawn through Dubhe and Merak of the big dipper.

Figure 5:
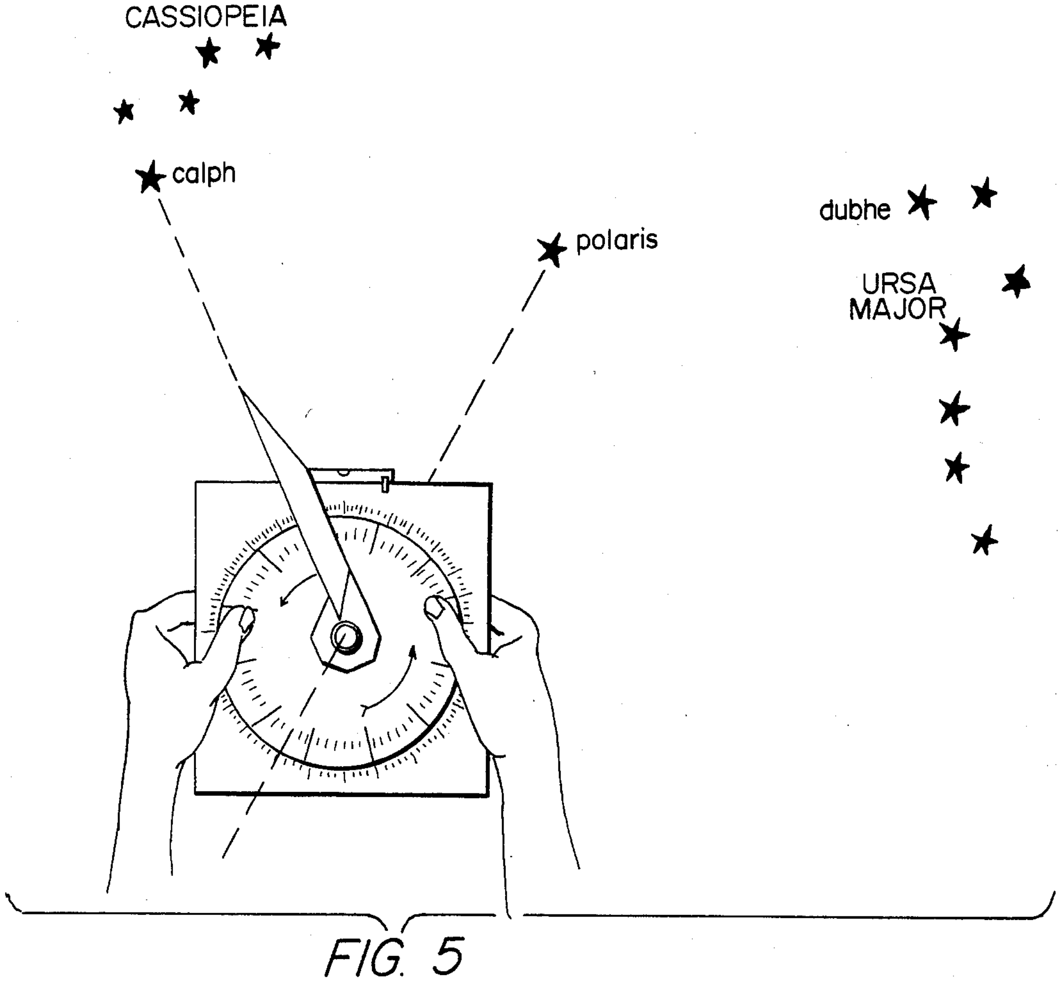
FIG. 5 is a schematic drawing showing the instrument of the present invention in use, with one position of two star clusters diagrammatically shown oriented relative to the dial.

After Polaris is located, the base plate 10 is gripped with one hand on each side of the plate and the thumbs overlying the outer edges of the dial, as seen in FIG. 5. The plate is held at arms length with the top of the board uppermost and the edge substantially level, and then a sighting of Polaris through the tube 14 is made with one eye. The calendar dial is then rotated by actuating the dial by means of the thumbs. Since the pointer is locked on the dial, it moves with the dial until the sighting edge 39 of the pointer points toward Calph, the lead star in the big W, or until it points toward Dubhe, the lead star in the big dipper. The top of the base plate is maintained as level as possible during the rotation of the dial.

After the sighting edge 39 has been moved to a position pointing at either Calph or Dubhe, standard time is read from the hour circle. If the sighting has been made on Calph, the hour is read at the apex of indicator 35 on the dial. If the sighting has been made on Dubhe, the hour is read at the apex of indicator 36. In each case the reading will be standard time and a one hour correction must be added for daylight saving time when applicable.

The instrument of the present invention can also be used as a navigational tool to determine the longitude of a current position. When using the star dial as a navigational tool to determine longitude, do not apply the correction of ± one day per degree of longitude east or west of the standard time meridian, instead, set point on actual current date in order to obtain civil time, the difference between this civil time and the standard time on the clock is what converts to difference in longitude. This procedure is based on the fact that the whole earth is divided into twenty-four standard time meridians, 15° apart in longitude, starting from Greenwich, England, east and west from 0° to 180°. Thus, the distance between adjacent meridians represents one hour of time, or expressed another way, one degree of longitude represents the passage of four (4) minutes in time.

In general, then, in using the present instrument, we determine the civil time of day at a particular position on a particular day and then compare this reading with the time indicated on a chronometer. The difference in time will indicate the distance the particular position is from a standard time meridian.

Accordingly, using the technique described above, a time reading is made on the time circle of the base plate. For example, if the reading found on the time circle is 8:20 p.m. and a watch or clock indicates that the correct eastern time is 9:20 p.m., the one hour difference indicates that the position is one hour of time or 15° longitude west of the eastern standard time meridian. Since the eastern standard meridian is at 75° west longitude, the position at which the reading was taken is approximately 90° west longitude. In other words, each one (1) minute of time that you read early on the time circle represents one-quarter ($\frac{1}{4}$) of a degree of longitude west of the standard time meridian used, and each minute of time that you read later than the standard time represents one-quarter ($\frac{1}{4}$) of a degree of longitude east of the standard time meridian used.

The time-indicating instrument of the present invention is especially designed for use in the northern hemisphere and will be fairly accurate until about 2400 A.D. at which time Polaris will have passed the North Pole and will be moving even further away due to precession.

From the foregoing description it will be apparent that the time indicator of the present invention is based on the concept that the two time systems, i.e. sideral time (based on the movement of the stars) and civil or standard time (based on the position of the mean sun) can be tied together by plotting the exact date of the vernal equinox, March 21.509, 1982 on the calendar dial, affixing an indicator on the calendar dial for the location of a particular star by measuring the angle of right ascension from the vernal equinox, and aligning the current date on the calendar dial with the actual position of the star while sighting the dial on Polaris. The time at which the alignment is made is indicated on a fixed 24 hour annular scale surrounding the dial.

The instrument of the present invention is simple in its structure, can be effectively used with only a minimum of instruction, and reads standard time, as distinguished from civil time, direct from the time disc.

I claim as my invention:

1. A device for telling time by reference to circumpolar stars comprising a base having a flat surface, means providing a circular time scale on said surface, a circular disc overlying said surface, means providing on said disc a calender scale in the form of indicia indicating the days of an entire year disposed in circular formation adjacent the graduations of the circular time scale, means mounting said disc for rotation about an axis relative to said base, a pointer overlying said disc, means mounting said pointer for rotation about said axis, means releasably attaching said pointer to said disc for rotary movement at times with said disc and at other times relative to said disc, and means providing a sighting aperture extending through said base at the axis of rotation of said pointer and said disc.

2. The device of claim 1 further means comprising providing indicia on said disc indicating the location of at least one star that rotates around the North Star.

3. The device of claim 1 further comprising means providing indicia on said disc indicating the location of at least one circumpolar star.

4. The device of claim 1 further comprising means providing indicia on said disc indicating the location of two star constellations located in different quadrants of a circular zone around the North Pole.

5. The device of claim 1 wherein said means for mounting said pointer on said disc is selectively separable from said disc to permit rotary movement of said pointer with said disc and to permit rotary movement of said pointer relative to said disc.

6. The device of claim 1 wherein said pointer has a straight side edge adapted to be selectively aligned with any date graduation on said calendar scale.

7. The device of claim 1 wherein said base is a flat plate having marginal areas adapted to be gripped in the hands of the user of the device.

8. The device of claim 1 wherein said base has an upper edge portion providing a flat surface, said device further comprising a spirit level secured in abutting contact with the flat surface of said upper edge portion.

9. A star dial comprising a base plate, means defining an hour scale disposed on said plate in a circular formation around an axis;

a circular dial mounted on said plate for rotation about said axis and having a peripheral edge disposed inwardly of and closely adjacent the hour scale, means defining a circular calendar scale on said dial adjacent said peripheral edge, said scale being divided into 365 graduations;

a pointer mounted adjacent said dial for rotation about said axis, said pointer being of a length to extend from said axis past the hour scale on said base plate and having a straight sighting edge disposed on a radius of a circle about said axis;

connector means between said pointer and said dial for connecting said pointer to said dial at any selected position relative to the graduations on said dial;

and sighting means carried by said plate and having an opening at said axis permitting a line of sight of Polaris that is substantially at right angles to said base plate.

10. The device of claim 1 further comprising means providing indicia on said disc indicating the location of at least two circumpolar stars in opposite quadrants.

11. A device as claimed in claim 1 and comprising means on said disc providing indicia located at the reverse direction angle of right of ascension from the vernal equinox to indicate the time of location of circumpolar stars in opposite quadrants.

12. A device for determining the time of day by correlating the movement of a circumpolar star with a pole star comprising:

a base with radially disposed indicia representing time of day;

a rotatable member adjacent said base with radially disposed indicia representing calender units angularly spaced apart and graduated on a calender unit basis, said rotatable member being disposed adjacent said base with the radially disposed indicia thereon concentric with the radially disposed indicia on said base;

time indicating means on said rotatable member;

a rotatable hand rotatable about a common axis with said rotatable member, said rotatable hand being set at the calender unit of said rotatable member representing the date for determining the time of day;

means for rotating said rotatable hand with said rotatable member; and sighting means coaxially disposed with said rotatable member and said rotatable hand for sighting a pole star and to enable the plane of said base to be disposed generally perpendicular to the line of sight with said pole star, whereby when said base is disposed with the high noon indicia disposed at the zenith thereof, and said sighting means is aligned with the polar star, and said rotatable member with said rotatable hand preset at the calender unit representing the current date are rotated in unison until said rotatable hand is aligned with said circumpolar star, the time of day is indicated by the position of said time indicating means relative to the indicia on said base.

13. The method of telling time by observing the movement of a particular circumpolar star relative to Polaris comprising the steps of providing a fixed scale with annular indicia calibrated in 24 hourly calibrations, providing a second scale having indicia calibrated in 365 days and rotatable about an axis aligned with the center of the annular indicia on said fixed scale, establishing a reference mark on said second scale indicative of the position of said particular star at the vernal equinox, aligning said axis with Polaris, rotating said second scale on said axis to align a current day indicium thereon with said particular star, and displaying the hour on said fixed scale at the indicia on said fixed scale that is in alignment with said reference mark.

14. A method of determining the time of day by correlating the movement of a circumpolar star around a pole star, said method comprising the steps of:

(a) providing indicia representing time of day;

(b) providing indicia representing calendar units and a time marker;

(c) orienting said indicia representing the time of day relative to said pole star;

(d) setting an indicator at the current calendar unit of the indicia representing the calendar units; and (e) advancing said indicator at the current calendar unit, said time marker and indicia representing said calendar units concurrently until said indicator is positioned relative to the circumpolar star while said indicia representing the time of day remains in its set position, whereby the position of said time marker relative to said indicia representing time of day indicates the hour of the current date.

15. A method of determining the time of day by correlating the movement of a circumpolar star with a polar star comprising the steps of:

(a) aligning a rotatable pointer with the current date on a calendar disc, said calendar disc being formed with means representing the location of a circumpolar star;

(b) moving said calendar disc and said rotatable pointer conjointly relative to a time member until said rotatable pointer is oriented relative to a circumpolar star; and (c) orienting said time member, said calendar disc and said rotatable member with a polar star, (d) said means representing the location of a circumpolar star indicates the time of day from said time member.

16. A method of determining the time of day as claimed in claim 15 wherein said means representing the location of a circumpolar star represents a plurality of circumpolar stars in opposite quadrants.

17. A method of determining the time of day as claimed in claim 15 wherein said means representing the location of a circumpolar star provides indicia located at the reverse direction angle of right ascension from the vernal equinox to indicate the time of location of circumpolar stars in opposite quadrants.

18. A method of determining the time of day by correlating the movement of a circumpolar star with a polar star comprising the steps of:

(a) moving a calendar disc relative to a time member until a current calendar unit thereon is oriented relative to a circumpolar star, said calendar disc being formed with means representing the location of a circumpolar star; and (b) orienting said time member and said calendar disc with a polar star, (c) said means representing the location of a circumpolar star indicates the time of day from said time member.

19. A method of determining the time of day as claimed in claim 18 wherein said means representing the location of a circumpolar star represents a plurality of circumpolar stars in opposite quadrants.

20. A method of determining the time of day as claimed in claim 18 wherein said means representing the location of a circumpolar star provides indicia located at the reverse direction angle of right ascension from the vernal equinox to indicate the time of location of circumpolar stars in opposite quadrants.

21. The method of predicting the time of the location of a circumpolar star on a selected date by correlating the movement of the circumpolar star around a pole star, comprising the steps of:

(a) providing indicia representing time of day including 12 noon;

(b) providing indicia representing calendar units;

(c) providing reference marks in conjunction with said calendar units indicia at the reverse angle of right ascension from the vernal equinox of a plurality of circumpolar stars;

(d) releasably securing a rotatable hand at a selected calendar unit representing the data on which the prediction is to take place adjusting for longitudinal correction;

(e) advancing said rotatable hand and indicia representing calendar units concurrently until said rotatable hand is aligned with 12 noon on said indicia representing time of day, indicia representing the time of day for the location of the circumpolar star is disposed adjacent to reference marker provided in conjunction with said calendar units indicia, reference marker indicates the time that the circumpolar star will be directly above the pole star on the selected date.

22. A device for determining the time of the day by correlating the movement of a circumpolar star with a polar star comprising:

a base with circumferentially disposed indicia representing time of day;

a rotatable member adjacent said base with circumferentially disposed indicia representing calendar units angularly spaced apart and graduated on a calendar unit basis, said rotatable member being disposed adjacent said base with the circumferentially disposed indicia thereon concentric with the circumferentially disposed indicia on said base, said rotatable member further comprising means providing stylized arrow heads on the periphery of said rotatable member in two opposite quadrants, said stylized arrow heads being positioned on the periphery of said rotatable member in the reverse direction angle of right ascension of Dubhe and Calph from March 21.509, the apex of said stylized arrow heads indicating the time of observation relative to the time indicia on said base;

a rotatable hand rotatable about a common axis with said rotatable member, said rotatable hand being set at the calendar unit of said rotatable member representing the date for determining the time of day, with adjustment for longitudinal correction;

means for rotating said rotatable hand selectively with said rotatable member; and sighting means coaxially disposed with said rotatable member and said rotatable hand for sighting a pole star and to enable the plane of said base to be disposed generally perpendicular to the line of sight with said pole star, whereby when said base is disposed with the high noon indicia disposed at the zenith thereof, and said sighting means is aligned with the pole star, and said rotatable member with said rotatable hand preset at the calendar unit representing the current date with adjustment for longitudinal correction are rotated in unison until said rotatable hand is aligned with said circumpolar star, the standard time of day is indicated by the position of the apex of said stylized arrow head relative to the time indicia on said base.

23. The method of telling time by observing the movement of a particular circumpolar star relative to Polaris comprising the steps of providing a fixed scale with annular indicia calibrated in 24 hourly calibrations, providing a second scale having annular indicia calibrated in 365 days and rotatable about an axis aligned with the center of the annular indicia on said fixed scale, establishing a reference mark on said second scale positioned at the reverse direction angle of right ascension of said particular star, said reference mark being indicative of time of day on said fixed scale, providing a rotatable hand overlying said second scale, providing means to selectively lock said rotatable hand at desired date on said second scale so as to make said rotatable hand move in unison with said second scale, setting said rotatable hand on current date with adjustment for longitudinal correction on said second scale, aligning said axis with Polaris, and rotating said second scale with said rotatable hand attached about said axis to align said rotatable hand with said particular star, the hour on said fixed scale is indicated at the indicia on said scale that is in alignment with said reference mark.

24. A method of determining the time of day by correlating the movement of a circumpolar star around a pole star, said method of comprising the steps of;

(a) provide indicia representing time of day;

(b) providing indicia representing calendar units;

(c) providing time indicator reference marks on said calendar unit indicia at the reverse angle of right ascension of the stars to be observed from March 21.509;

(d) providing a pointer hand for the purpose of setting current date on said indicia representing calendar units and for aligning said data relative to a circumpolar star;

(e) orienting said indicia representing the time of day relative to said pole star;

(f) setting said pointer hand at the current calendar unit of the indicia representing the calendar units; and (g) advancing said pointer hand and indicia representing said calendar units concurrently until said pointer hand is positioned relative to a circumpolar star while said indicia representing the time of day remains in its set position, whereby the position of said reference mark relative to said indicia representing time of day indicates the hour of the current day.

* * * * *